(12) United States Patent
Ali et al.

(10) Patent No.: US 12,613,895 B2
(45) Date of Patent: Apr. 28, 2026

(54) SYSTEMS AND METHODS FOR QUERYING A DOCUMENT POOL

(71) Applicant: JPMORGAN CHASE BANK, N.A., New York, NY (US)

(72) Inventors: Syed Ali, Aston, PA (US); Sai Chaitanya Darla, McKinney, TX (US); Owen Churchill, Columbus, OH (US); Vlad Tyshkevich, Brooklyn, NY (US); Oluwaseye Adekanye, Middletown, DE (US); Jose Burgos, Dallas, TX (US); Siva Tanuku, Westerville, OH (US); Rudolph L Mappus, IV, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 203 days.

(21) Appl. No.: 18/543,093

(22) Filed: Dec. 18, 2023

(65) Prior Publication Data

US 2025/0200091 A1     Jun. 19, 2025

(51) Int. Cl.
| | |
|---|---|
| *G06F 16/33* | (2025.01) |
| *G06F 16/28* | (2019.01) |
| *G06F 16/332* | (2019.01) |
| *G06F 16/334* | (2025.01) |
| *G06F 16/338* | (2019.01) |

(Continued)

(52) U.S. Cl.
CPC ........ *G06F 16/3347* (2019.01); *G06F 16/284* (2019.01); *G06F 16/332* (2019.01); *G06F 16/334* (2019.01); *G06F 16/338* (2019.01);

*G06F 40/30* (2020.01); *G06F 40/40* (2020.01); *G06F 16/3323* (2019.01); *G06F 16/3344* (2019.01); *G06F 40/284* (2020.01); *G06F 40/289* (2020.01)

(58) Field of Classification Search
CPC ...... G06F 16/284; G06F 16/33; G06F 16/332; G06F 16/3322; G06F 16/3323; G06F 16/3329; G06F 16/334; G06F 16/3344; G06F 16/3346; G06F 16/3347; G06F 16/3349; G06F 16/338
See application file for complete search history.

(56) References Cited

U.S. PATENT DOCUMENTS

| | | | | |
|---|---|---|---|---|
| 10,262,062 | B2 * | 4/2019 | Chang | ................. G06F 16/3329 |
| 11,151,177 | B2 * | 10/2021 | Li | ........................... G06N 3/042 |

(Continued)

*Primary Examiner* — Richard Z Zhu
(74) *Attorney, Agent, or Firm* — GREENBERG TRAURIG LLP

(57) ABSTRACT

In some aspects, the techniques described herein relate to a method including: receiving, at a query platform, a query text string; tokenizing, by the query platform, the query text string, wherein the tokenizing generates a query vector embedding; determining, by the query platform, a document vector embedding, wherein the document vector embedding is above a similarity threshold with respect to the query vector embedding; retrieving, by the query platform, textual document data related to the document vector embedding; sending, by the query platform, the query text string and the textual document data to a generative model engine; receiving, by the query platform and from the generative model engine, a natural language response to the query text string; and displaying, by the query platform, the natural language response via an interface.

17 Claims, 4 Drawing Sheets

(51) Int. Cl.
    *G06F 40/30*            (2020.01)
    *G06F 40/40*            (2020.01)
    *G06F 40/284*        (2020.01)
    *G06F 40/289*        (2020.01)

(56)          References Cited

U.S. PATENT DOCUMENTS

| | | | |
|---|---|---|---|
| 11,997,056 B2 * | 5/2024 | Bhatia | G06F 40/295 |
| 12,026,187 B2 * | 7/2024 | Boytsov | G06N 3/047 |
| 12,039,263 B1 * | 7/2024 | Mondlock | G06F 40/20 |
| 12,079,570 B1 * | 9/2024 | Mondlock | G06F 40/20 |
| 2020/0364233 A1 * | 11/2020 | Chan | G06F 16/24578 |
| 2024/0152561 A1 * | 5/2024 | Mallapragada | G06F 16/90335 |
| 2025/0086737 A1 * | 3/2025 | Walters | H04L 51/216 |
| 2025/0103640 A1 * | 3/2025 | Dicklin | G06F 16/3334 |

* cited by examiner

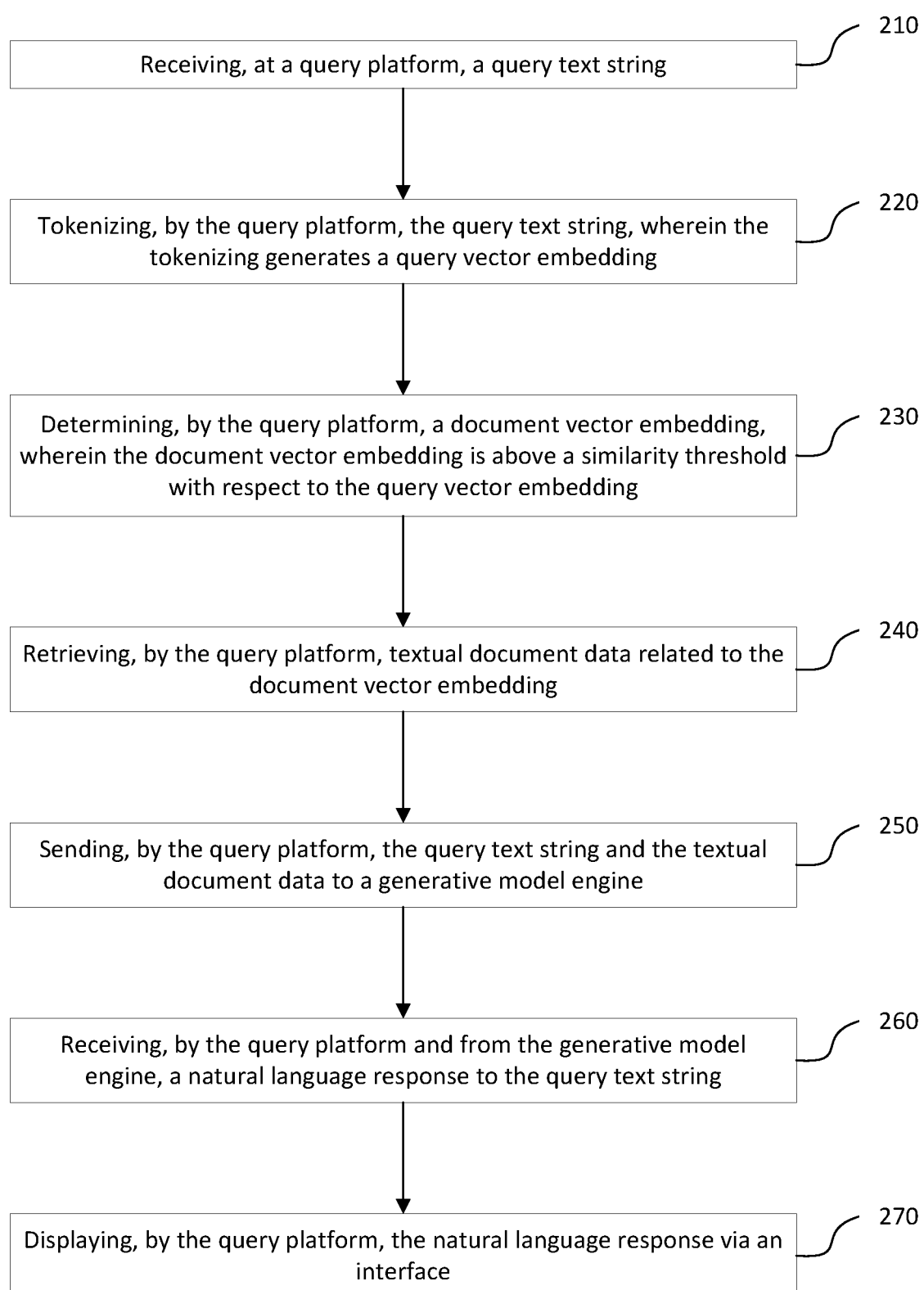

Receiving, at a query platform, a query text string — 210

Tokenizing, by the query platform, the query text string, wherein the tokenizing generates a query vector embedding — 220

Determining, by the query platform, a document vector embedding, wherein the document vector embedding is above a similarity threshold with respect to the query vector embedding — 230

Retrieving, by the query platform, textual document data related to the document vector embedding — 240

Sending, by the query platform, the query text string and the textual document data to a generative model engine — 250

Receiving, by the query platform and from the generative model engine, a natural language response to the query text string — 260

Displaying, by the query platform, the natural language response via an interface — 270

FIGURE 2

Retrieving, by a document encoding module, a document from a document pool                310

Generating a token from text in the document                320

Generating, by a document embedding module, a document vector embedding based on the token                330

Storing, by the document embedding module, the document vector embedding in a vector database                340

SYSTEMS AND METHODS FOR QUERYING A DOCUMENT POOL

BACKGROUND

1. Field of the Invention

Aspects generally relate to systems and methods for querying a document pool.

2. Description of the Related Art

Generative models may provide natural language responses to natural language queries. The provided natural language response, however, may be based on various public documents that a model has been trained to consider and use in generation of the response. Accordingly, the provided response may be out of scope with respect to the limited universe of knowledge that is relevant to a particular organization. Accordingly, a process that can not only limit a model's scope of consideration to an organization's institutional knowledge, but that can also determine documents from that institutional knowledge base that are particularly relevant to a submitted query would be beneficial.

SUMMARY

In some aspects, the techniques described herein relate to a method including: receiving, at a query platform, a query text string; tokenizing, by the query platform, the query text string, wherein the tokenizing generates a query vector embedding; determining, by the query platform, a document vector embedding, wherein the document vector embedding is above a similarity threshold with respect to the query vector embedding; retrieving, by the query platform, textual document data related to the document vector embedding; sending, by the query platform, the query text string and the textual document data to a generative model engine; receiving, by the query platform and from the generative model engine, a natural language response to the query text string; and displaying, by the query platform, the natural language response via an interface.

In some aspects, the techniques described herein relate to a method, wherein the query platform retrieves the textual document data using a document identifier that is related to the textual document data.

In some aspects, the techniques described herein relate to a method, wherein the textual document data includes a token, and where in the token was generated from a document stored in a document pool.

In some aspects, the techniques described herein relate to a method, wherein the document identifier is related to the document, the token, and the document vector embedding.

In some aspects, the techniques described herein relate to a method, wherein the document vector embedding is stored in a vector database.

In some aspects, the techniques described herein relate to a method, wherein the generative model engine is provided by a third party.

In some aspects, the techniques described herein relate to a method, wherein the generative model engine includes a generative pretrained transformer (GPT) model.

In some aspects, the techniques described herein relate to a system including at least one computer including a processor, wherein the at least one computer is configured to: receive, at a query platform, a query text string; tokenize, by the query platform, the query text string, wherein the tokenizing generates a query vector embedding; determine, by the query platform, a document vector embedding, wherein the document vector embedding is above a similarity threshold with respect to the query vector embedding; retrieve, by the query platform, textual document data related to the document vector embedding; send, by the query platform, the query text string and the textual document data to a generative model engine; receive, by the query platform and from the generative model engine, a natural language response to the query text string; and display, by the query platform, the natural language response via an interface.

In some aspects, the techniques described herein relate to a system, wherein the query platform retrieves the textual document data using a document identifier that is related to the textual document data.

In some aspects, the techniques described herein relate to a system, wherein the textual document data includes a token, and where in the token was generated from a document stored in a document pool.

In some aspects, the techniques described herein relate to a system, wherein the document identifier is related to the document, the token, and the document vector embedding.

In some aspects, the techniques described herein relate to a system, wherein the document vector embedding is stored in a vector database.

In some aspects, the techniques described herein relate to a system, wherein the generative model engine is provided by a third party.

In some aspects, the techniques described herein relate to a system, wherein the generative model engine includes a generative pretrained transformer (GPT) model.

In some aspects, the techniques described herein relate to a non-transitory computer readable storage medium, including instructions stored thereon, which instructions, when read and executed by one or more computer processors, cause the one or more computer processors to perform steps including: receiving, at a query platform, a query text string; tokenizing, by the query platform, the query text string, wherein the tokenizing generates a query vector embedding; determining, by the query platform, a document vector embedding, wherein the document vector embedding is above a similarity threshold with respect to the query vector embedding; retrieving, by the query platform, textual document data related to the document vector embedding; sending, by the query platform, the query text string and the textual document data to a generative model engine; receiving, by the query platform and from the generative model engine, a natural language response to the query text string; and displaying, by the query platform, the natural language response via an interface.

In some aspects, the techniques described herein relate to a non-transitory computer readable storage medium, wherein the query platform retrieves the textual document data using a document identifier that is related to the textual document data.

In some aspects, the techniques described herein relate to a non-transitory computer readable storage medium, wherein the textual document data includes a token, and where in the token was generated from a document stored in a document pool.

In some aspects, the techniques described herein relate to a non-transitory computer readable storage medium, wherein the document identifier is related to the document, the token, and the document vector embedding.

In some aspects, the techniques described herein relate to a non-transitory computer readable storage medium, wherein the document vector embedding is stored in a vector database.

In some aspects, the techniques described herein relate to a non-transitory computer readable storage medium, wherein the generative model engine is provided by a third party, and wherein the generative model engine includes a generative pretrained transformer (GPT) model.

In some aspects, the techniques described herein relate to a method including: retrieving, by a document encoding module, a document from a document pool; generating a token from text in the document; generating, by a document embedding module, a document vector embedding based on the token; storing, by the document embedding module, the document vector embedding in a vector database.

BRIEF DESCRIPTION OF THE DRAWINGS

FIG. 2 is a logical flow for querying a document pool, in accordance with aspects.

DETAILED DESCRIPTION

Figure 1:
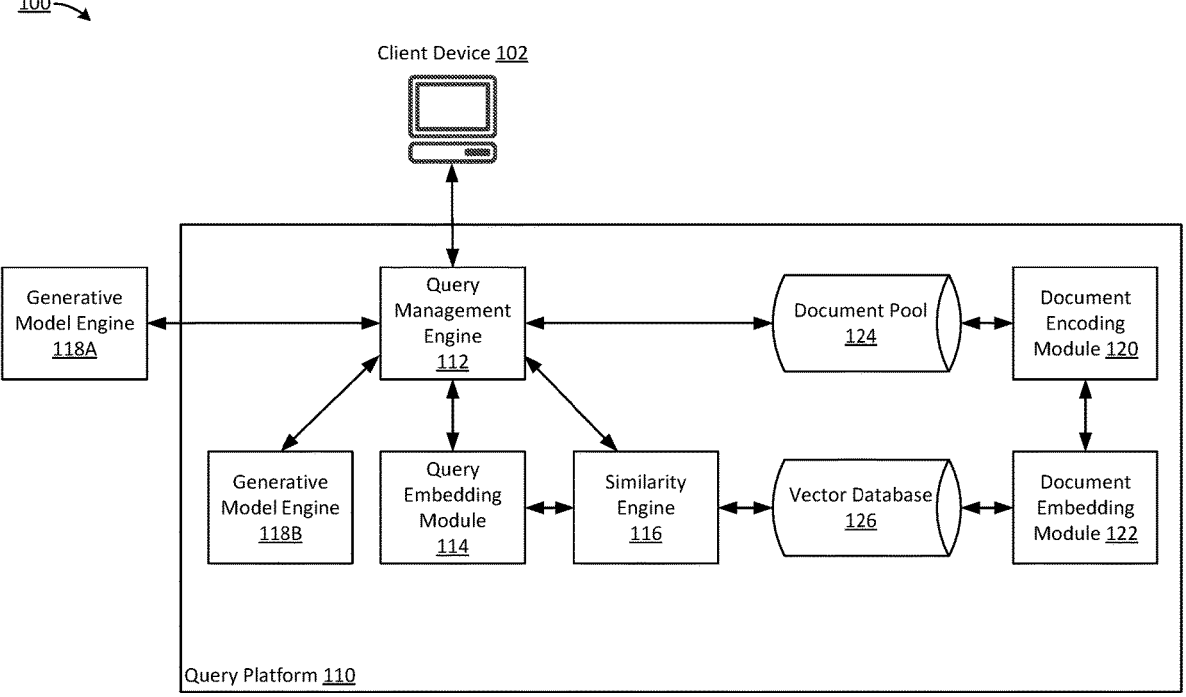
FIG. 1 is a block diagram of a system for querying a document pool, in accordance with aspects.

Aspects generally relate to systems and methods for querying a document pool.

Aspects may provide a query platform that receives a natural language query as input, performs a semantic query based on documents in a document pool and returns a natural language response. In accordance with aspects, an implementing organization may provide a natural language query prompt, which may be configured to receive a natural language query, e.g., from an end user or programmatically (e.g., via an application programming interface (API)). A natural language query prompt may include a user interface, such as a graphical user interface, where an end use may provide a natural language query to the natural language query prompt. In some aspects, a natural language query prompt may be provided via a query management engine A query management engine may act as a central management component of a query platform.

In accordance with aspects, a query management engine may provide a natural language query prompt, and may receive, via the prompt, a natural language query generated by an end-user of a query platform. The natural language query may be provided as or may be converted into a query text string. The query text string may be provided to a query embedding module. A query embedding module may receive the query text string as input and generate a query vector embedding from the query text string. A query vector embedding may include a vector representation of the query text string. A vector representation of the query text string is a numerical representation of the semantic meaning of the query text string. Aspects may generate a query vector embedding from a received query text string in real time (i.e., as, or immediately after, the query text string is received).

Aspects may further include a document pool. Documents in a document pool may include any form of unstructured data, such as word processor documents, portable document format (.pdf) documents, text (.txt) files, webpages (e.g., HTML format), etc. An exemplary document pool may be or include a knowledge base repository of an implementing organization. For instance, an implementing organization may maintain a knowledge base of articles in any suitable format. The documents may include institutional knowledge with respect to the implementing organization's processes, procedures, systems, etc. A document pool may store documents in a document's native format (e.g., a word processor format, a .pdf format, a .txt format, an HTML format, etc.). A document pool may take any suitable electronic storage architecture, such as a relational database, a data lake, a data warehouse, or any other suitable datastore.

In accordance with aspects, a document encoding module may also be provided. A document encoding module may receive documents (e.g., documents stored in a document pool) as input. A document encoding module may execute a tokenization process that tokenizes text included in a received document. A tokenization process may divide a document into one or more portions of text (i.e., one or more tokens). Each portion may be a collection of one or more words and may be referred to as a token. Documents may be divided into tokens based on single words, word phrases, sentences, paragraphs, sections, chapters, etc., up to the text of an entire document.

With respect to each document portion, a tokenization process may split text on white space, may remove punctuation and stop words, and may retain words and/or terms that are useful in a semantic evaluation of a document's contents to generate a token. Tokens may be stored in an appropriate data store with a relation, or association, to the document from which the token was generated. For example, a token may be stored in a datastore with a relationship to a unique document identifier (a document ID), where the unique document identifier identifies the document from which the token was generated. In some aspects, tokens generated from documents stored in a document pool may also be stored in the document pool. In other aspects, tokens may be stored separately.

In accordance with aspects, documents in a document pool may include text-based documents or image-based documents. In some aspects, a document encoding module may include an optical character recognition (OCR) engine. An OCR engine may generate text from any input documents that are image-based. An OCR procedure may be carried out prior to a tokenization process. Accordingly, if an image-based document is received by a document encoding module, the document encoding module may first process the image-based document with an OCR process of an OCR engine in order to generate text from the image-based document. The generated text may then be processed with a tokenization process to generate tokens associated with the document, as described herein.

Aspects may further include a document embedding module. A document embedding module may generate a document vector embedding that is associated with a document. A document vector embedding is a vector representation (i.e., a numeric representation) of a semantic meaning of text included in a group of tokens generated from a tokenized document, and in turn, of the associated document itself. Accordingly, respective document vector embeddings associated with two or more documents may be used, mathematically, to determine a relative similarity between the two or more documents. For instance, given several document vector embeddings associated with respective documents, two document vector embeddings that are relatively more similar in terms of a mathematical similarity measurement (e.g., cosine similarity) will indicate a closer semantic similarity among their respective associated documents. That is, the more similar a document's vector embedding(s) is/are to another document's vector embedding(s) (using a similarity measure), the closer these documents will be in terms of semantics (i.e., semantic data).

Each document vector embedding may be generated from one or more tokens that are associated with a given document. In some aspects, a document vector embedding may be generated from all tokens that have been generated from a document's text. That is, the relevant document vector embedding would represent the semantic meaning of the text of the entire document. In other aspects, document vector embeddings may be generated from one or more tokens that were generated from a portion of a document (as described herein). That is, the relevant document vector embedding would represent the semantic meaning of the word, sentence, paragraph, chapter, etc., from which the token or tokens were generated.

In accordance with aspects, a document encoding module and/or a document embedding module may be configured to parse documents in a document pool and generate tokens and corresponding embeddings (respectively) for documents in a document pool. A document encoding module may be in operative communication with a document pool and may be configured to iterate through documents stored in the document pool and generate one or more tokens for each document in the document pool. The document embedding module may pass each generated token to a document embedding module, which may generate a document vector embedding from each received token. In another aspect, a document embedding module may retrieve tokens from a token datastore, such as a document pool, and generate document vector embeddings from the retrieved tokens.

A document encoding module and/or a document embedding module may be configured to parse a document pool or other datastore and generate updated tokens or embeddings (respectively) based on content that has changed since a last token/embedding generation. That is, a document encoding module and/or document embedding module may be configured to determine changes in documents stored in a document pool and generate updated output that accurately reflects the change in content in the stored documents.

Aspects may store generated document vector embeddings with a reference or association to the token whose semantic meaning the corresponding document vector embedding represents. That is, if a given document vector embedding represents "Token A," then the given document vector embedding may be stored with a relation or association to Token A. The reference, relation, association, etc., may be, e.g., a unique document identifier (a document ID) that may be used as a lookup key, such as a primary key, which may be further used to retrieve an associated token from a datastore.

Accordingly, a token that is associated with a document vector embedding may be retrieved from a datastore (such as a document pool) by first retrieving the document identifier that is stored with the document vector embedding, and then generating a query of a datastore that retrieves the document associated with the document ID from the datastore. In some aspects, a single identifier, such as a unique document identifier, may interrelate a source document, a token generated from the source document, and a document vector embedding generated based on the token that is related to the source document.

In accordance with aspects, document vector embeddings generated by a document embedding module may be stored in a vector database. A vector database is a database that is optimized for storing, indexing, searching, and retrieving vectors, such as vectors that are included in document text embeddings. A vector database may be optimized for use with a similarity engine and a similarity measurement function.

In accordance with aspects, a similarity engine may be provided as a component of a query platform. A similarity engine may be configured to receive a query vector embedding from a query embedding module. A similarity engine may be configured to search a vector database and determine and/or retrieve a number of document vector embeddings that are similar to the received query vector embedding. For instance, the similarity engine may be configured to determine the top N most similar document vector embeddings with respect to a received query vector embedding (e.g., a top-N analysis). A determination of similarity between a query vector embedding and a document vector embedding may be made using a mathematical similarity measurement, such as cosine similarity. Any suitable similarity measurement or measurement function may be used in determining similarity.

In accordance with aspects, a similarity engine may be configured to determine a document identifier that is associated with each document vector embedding that is determined to be above a similarity threshold (e.g., each document vector embedding that is determined to be in the top N most similar embeddings) with respect to a received query vector embedding. A query platform (e.g., a query management engine) may be configured to receive each determined document identifier and query a document pool using the determined document identifiers to retrieve each document and/or each token that is associated with the determined similar document vector embeddings.

Aspects may include or have access to a generative model platform or engine. A generative model engine may provide access to a generative machine learning model. Exemplary generative machine learning models include large language models (LLMs), such as a generative pretrained transformer (GPT) model. A generative model engine may provide access to any suitable generative model, and to an interface for submitting data to the model as input and receiving data from the model as output.

Aspects may utilize a private generative model engine or public generative model engine. A public model engine, for instance, may be offered as a commercial service, where the commercial service provides a public interface that may be accessed by customers of the commercial service. A private model engine may be maintained and configured by an implementing organization for use by the implementing organization.

In accordance with aspects, an interface to a generative model engine may accept data as input to the generative model engine and/or to a generative model included and executed therein. The interface may be an API interface that publishes API methods that may be called by other platform components. For instance, an API method may be called programmatically by a query management engine. The API method may specify optional or mandatory data parameters (also called arguments) that may be provided as input to the API and, in turn, the publishing generative model engine.

In accordance with aspects, a generative model engine may be configured to receive text data from a document as input to the model. For instance, an exemplary model may be configured to receive, via an interface, one or more tokens generated from documents e.g., in a document pool. In other aspects, a generative model engine may be configured to receive documents retrieved from a document pool. Further, a generative model may be configured to receive, via an interface, a unique document identifier that is associated with each received document and/or token. A generative model engine may additionally be configured to receive a query text string. These data may be received, e.g., as method parameters of a method exposed by an API of the generative model engine.

In accordance with aspects, a query management engine may be configured to receive document identifiers from, e.g., a similarity engine, and to execute a query of a document pool, where the query is formatted to retrieve/return each document and/or each token that is associated with each document identifier included in the query by the query management engine. As used herein, the term textual document data refers to any combination of documents or tokens that is returned in a query based on associated document identifiers and that is sent to a generative model engine for analysis. A query management engine may then be configured to pass textual document data and corresponding document identifiers to a generative model. A query management engine may be further configured to pass a query text string to a generative model. For instance, an API method may be exposed by a generative model engine and the API method may be called by a query management engine. A query management engine may include data parameters in the exposed API method. Data parameters may include textual document data (i.e., documents and/or tokens), associated document identifiers, and a query text string.

In accordance with aspects, a generative model engine may be configured to receive a query text string and textual document data, and to formulate a natural language response to the query text string based on the text in the one or more received documents. A generative model included in a generative model engine may be trained on public or private documents to generate natural language responses to a received query based on a set of documents. In some aspects, however, an organization may wish to limit the number and scope of documents from which a generative model may generate a response to a query. This limited document set may be provided particularly due to its relevance to the submitted query. For instance, the limited document set may be based on a top N number of documents that are similar to a submitted query, as described above.

In some aspects, an API method exposed by a generative model engine may include an instructional parameter that instructs the model engine to generate a response using only textual data (e.g., received documents and/or tokens) received from a query platform (i.e., only textual document data received from the calling platform). In other aspects, an API method may call functions of a generative model engine that are configured to generate responses based only on textual data (e.g., document textual data) that is received with the method call. That is, a model engine may be instructed, configured, etc., to generate a response based on textual document data received from a calling platform, and may not base a response on documentation outside of that received from a calling platform. In this way, the response to a received query will be generated based on a limited universe of documentation that may be supplied by a calling platform and that may be particularly provided by the calling platform due to the documentation's relevance to the submitted query.

In accordance with aspects, a generative model engine may return response (e.g., as a return response to a called API method) a natural language response to a received query text string. The response may be generated based on textual document data received by the generative model engine. A response may further include one or more document identifiers that are associated with documents that the generative model engine used to generate the natural language response. The natural language response may be received by the calling platform (e.g., a query platform or a query management engine of a query platform). Additionally, the platform may receive document identifiers of the documents used to generate the response.

Upon receipt of a natural language response from a generative model engine, a query management engine may send the response to an interface (e.g., a user interface). For instance, a query management engine may send the natural language response generated by a generative model to a graphical user interface for viewing/reading of the response by an end user. The query management engine may also include one or more document identifiers associated with the documents that were used by the generative model engine to generate the natural language response. In this way, an end user may be able to access the textual document data using the supplied document identifier(s). In an exemplary aspect, a query management engine may provide the document identifier as a hyperlink, where the hyper link is configured to open a document that is associated to the hyperlinked document identifier, providing an end user with streamlined access to the relevant document.

FIG. 1 is a block diagram of a system for querying a document pool, in accordance with aspects. System 100 includes query platform 110. System 100 and query platform 110 may be part of the technology infrastructure of an implementing organization. Query platform 110 includes query management engine 112, query embedding module 114, similarity engine 116, and generative model 118B. Query platform 110 further includes document encoding module 120, document embedding module 122, document pool 124, and vector database 126. System 100 further includes client device 102 and generative model engine 118A.

In accordance with aspects, document pool 124 may be a document repository and may be any suitable data store (e.g., a relational database, a data lake, etc.). Document encoding module 120 may be configured to be in operative communication with document pool 124 and may be configured to iterate through documents stored in document pool 124 and process the documents with a tokenization process. A tokenization process of document encoding module 120 may generate tokens related to the documents stored in document pool 124 as described in more detail herein. Document encoding module 120 may then store the generated tokens with a reference to a document identifier, where the document identifier relates one or more tokens generated from a document to the document.

In accordance with aspects, document embedding module 122 may be configured to generate document vector embeddings from tokens. Document embedding module 122 may generate document vector embeddings and store the document vector embeddings in vector database 126. The document vector embeddings may be stored with the document identifier that is associated with the corresponding token from which the document vector embedding was generated. This document identifier may further be related to the relevant document, thereby associating the source document, any tokens generated from the source document and any document vector embeddings generated from the corresponding tokens.

As noted herein, document encoding module 120 and document embedding module 122 may periodically or continually parse documents stored in document pool 124 to identify updates and/or new documents and may perform tokenization and vector embedding processes in order to maintain up-to-date tokens and corresponding vector embeddings that correspond to the documents stored in document pool 124. This may be done periodically, or in real time (e.g., as a document is added or updated).

In accordance with aspects, query management engine 112 may provide (e.g., as a published web page, an application, etc.) an interface and the interface may provide a natural language query prompt. Client device 102 may be configured to access the interface via a web browser, installed application, etc. An end user of client device 102 may provide a natural language query as input to the natural language query prompt. For instance, an end user of client device 102 may type a natural language query into the prompt and may submit the query. Query management engine 112 may receive the query and may pass the natural language query as a query text string to query embedding module 114.

In accordance with aspects, query embedding module 114 may receive the query text string and may generate a query vector embedding from the query text string, as described here. Query embedding module 114 may then send the query vector embedding to similarity engine 116.

Similarity engine 116 may execute a similarity function to determine textual document data that are above a similarity threshold with respect to a received query vector embedding. In an exemplary aspect, similarity engine 116 may search vector database 126 for, e.g., a top N number of similar documents as measured by a similarity function such as cosine similarity. Similarity engine 116 may identify document identifiers that are related to the document vector embeddings that are determined to be similar (e.g., the top N number of similar documents). Similarity engine 116 may send the determined document identifiers to, e.g., query management engine 112 for further processing.

In accordance with aspects, query management engine 112 may query document pool 124 to retrieve documents or tokens (i.e., textual document data) that are stored with a relation to the document identifiers identified by similarity engine 116. Query management engine 112 may then include a query text string received (e.g., received from client device 102), the retrieved textual document data, and the corresponding document identifiers to a generative model engine (e.g., generative model engine 118A and/or generative model 118B).

Generative model engine 118A represents a public or commercial generative model engine. Generative model engine 118A may be provided by a third party and may publish a public API. Query platform 110 (e.g., query management engine 112) may be configured to access generative model engine 118A via a public API gateway. Generative model engine 118A may be offered as a commercial service (e.g., a subscription service having a cost associated with its use). Generative model 118B represents a generative model engine that is private to query platform 110 (e.g., private to an organization that implements query platform 110). Generative model 118B may also publish an API, but the API may only be accessible to components of query platform 110 or components provided by or associated with an implementing organization's technology infrastructure.

Query platform 110 may submit a query text string, retrieved textual document data, and corresponding document identifiers to a generative model engine (e.g., generative model engine 118A and/or generative model 118B). The submission may be via a method call to an API method published by the generative model engine. The generative model engine may be configured to formulate a response to the query text string based on the textual document data. The generative model engine may be configured to formulate a return response to the submitted data that includes a natural language response to the submitted query text string and one or more document identifiers that are associated with the textual document data (i.e., the document(s) and/or token(s)) on which the response was based. The return response may be a return function of a called API method.

In accordance with aspects, query platform 110 (e.g., query management engine 112) may receive the natural language response and the relevant document identifiers from a generative model engine and may update a query prompt of a provided interface with the natural language response and the document identifiers that are related to the documents on which the natural language response was generated. A provided interface may display the natural language response and the document identifiers to an end user via the provide interface (e.g., an end user of client device 102).

FIG. 2 is a logical flow for querying a document pool, in accordance with aspects.

Step 210 includes receiving, at a query platform, a query text string.

Step 220 includes tokenizing, by the query platform, the query text string, wherein the tokenizing generates a query vector embedding.

Step 230 includes determining, by the query platform, a document vector embedding, wherein the document vector embedding is above a similarity threshold with respect to the query vector embedding.

Step 240 includes retrieving, by the query platform, textual document data related to the document vector embedding.

Step 250 includes sending, by the query platform, the query text string and the textual document data to a generative model engine.

Step 260 includes receiving, by the query platform and from the generative model engine, a natural language response to the query text string.

Step 270 includes displaying, by the query platform, the natural language response via an interface.

Figure 3:
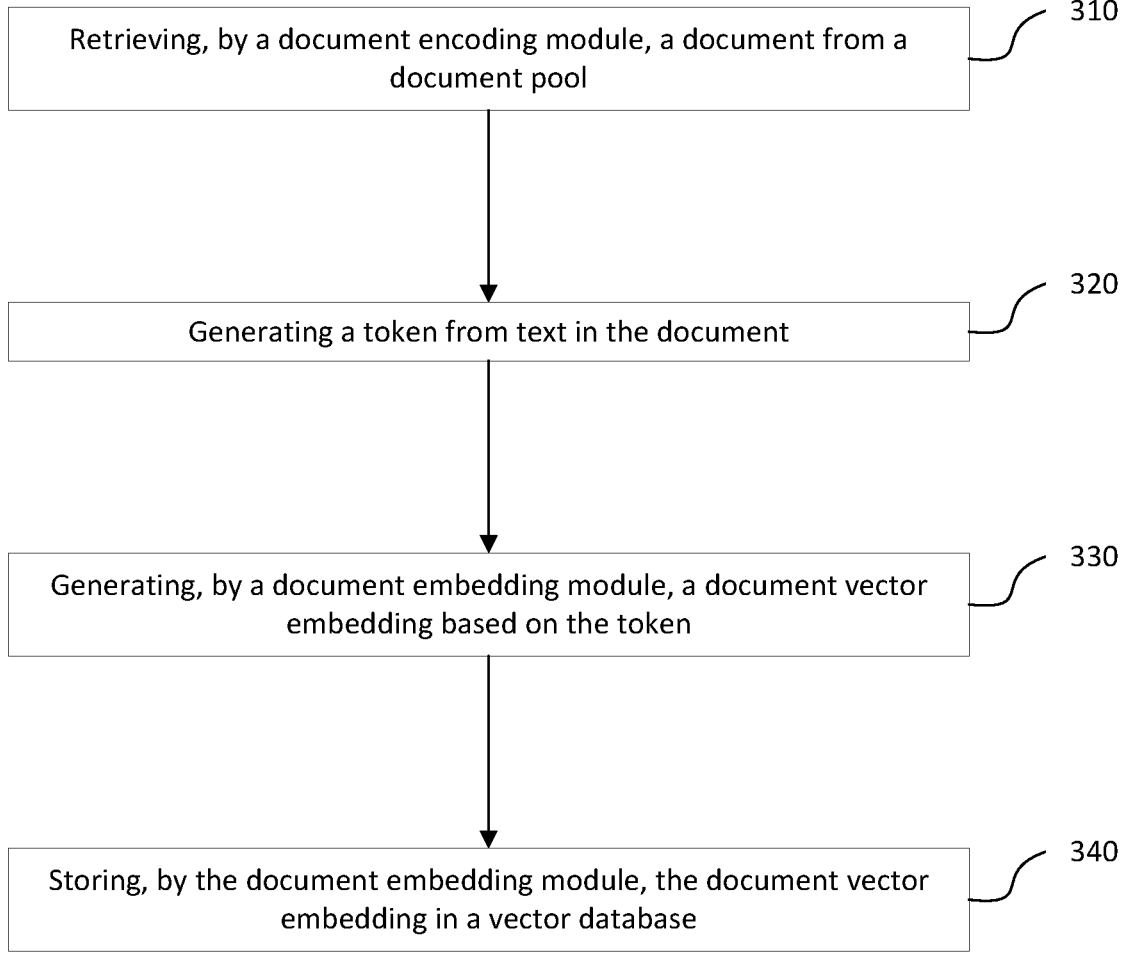
FIG. 3 is a logical flow for generating document vector embeddings, in accordance with aspects.

FIG. 3 is a logical flow for generating document vector embeddings, in accordance with aspects.

Step 310 includes retrieving, by a document encoding module, a document from a document pool.

Step 320 includes generating a token from text in the document.

Step 330 includes generating, by a document embedding module, a document vector embedding based on the token.

Step 340 includes storing, by the document embedding module, the document vector embedding in a vector database.

Figure 4:
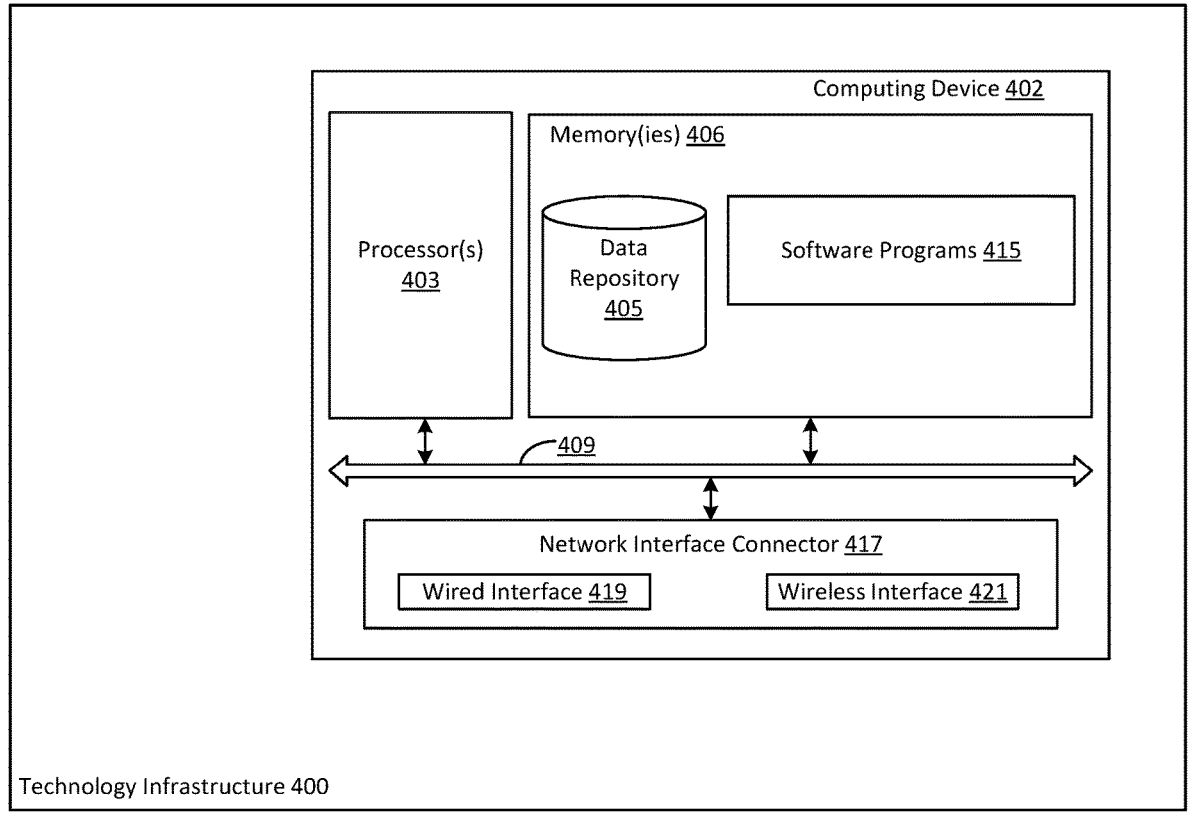
FIG. 4 is a block diagram of a technology infrastructure and computing device for implementing certain aspects of the present disclosure, in accordance with aspects.

FIG. 4 is a block diagram of a technology infrastructure and computing device for implementing certain aspects of the present disclosure, in accordance with aspects. FIG. 4 includes technology infrastructure 400. Technology infrastructure 400 represents the technology infrastructure of an implementing organization. Technology infrastructure 400 may include hardware such as servers, client devices, and other computers or processing devices. Technology infrastructure 400 may include software (e.g., computer) applications that execute on computers and other processing devices. Technology infrastructure 400 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 400 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 400 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 400 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 400 may include both wired and wireless components and interfaces and may interface with servers and other hardware via either wired or wireless communications. A computer network of technology infrastructure 400 may be a private network but may interface with a public network (such as the internet) to facilitate operative communication between computers executing on technology infrastructure 400 and computers executing outside of technology infrastructure 400.

FIG. 4 further depicts exemplary computing device 402. Computing device 402 depicts exemplary hardware that executes the logic that drives the various system components described herein. Servers and client devices may take the form of computing device 402. While shown as internal to technology infrastructure 400, computing device 402 may be external to technology infrastructure 400 and may be in operative communication with a computing device internal to technology infrastructure 400.

In accordance with aspects, system components such as a query platform, a query management engine, a query embedding module, a similarity engine, a generative model engine, a document encoding module, a document embedding module, a vector database, client devices, servers, various database engines and database services, and other computer applications and logic may include, and/or execute on, components and configurations the same, or similar to, computing device 402.

Computing device 402 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 402 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:
1. A method comprising:
receiving, at a query platform, a query text string;

tokenizing, by the query platform, the query text string, wherein the tokenizing generates a query vector embedding;

determining, by the query platform, a document vector embedding by numerically representing a semantic meaning of text of a group of tokens from a document;

comparing the document vector embedding to the query vector embedding and determining the comparison is above a similarity threshold;

retrieving, by the query platform, textual document data of the document related to the document vector embedding by using a document identifier from a datastore, wherein the document identifier interrelates the document, a token of the group of tokens from the document, and the document vector embedding;

determining, by a similarity engine of the query platform, a similar document vector embedding based on the document vector embedding;

sending, by the query platform, an input comprising the query text string, the textual document data, the document embedding vector, and the similar document vector embedding to a generative model engine;

expose, by the generative model engine, an instructional parameter that instructs the generative model engine to generate a response using only documents associated with the group of tokens;

receiving, by the query platform and from the generative model engine, a natural language response to the input; and displaying, by the query platform, the natural language response via an interface.

2. The method of claim 1, wherein the query platform retrieves the textual document data using a document identifier that is related to the textual document data.

3. The method of claim 2, wherein the textual document data includes a token, and where in the token was generated from a document stored in a document pool.

4. The method of claim 1, wherein the document vector embedding is stored in a vector database.

5. The method of claim 1, wherein the generative model engine is provided by a third party.

6. The method of claim 1, wherein the generative model engine includes a generative pretrained transformer (GPT) model.

7. A system comprising at least one computer including a processor, wherein the at least one computer is configured to:

receive, at a query platform, a query text string;

tokenize, by the query platform, the query text string, wherein the tokenizing generates a query vector embedding;

determine, by the query platform, a document vector embedding by numerically representing a semantic meaning of text of a group of tokens from a document;

compare the document vector embedding to the query vector embedding and determining the comparison is above a similarity threshold;

retrieve, by the query platform, textual document data of the document related to the document vector embedding by using a document identifier from a datastore, wherein the document identifier interrelates the document, a token of the group of tokens from the document, and the document vector embedding;

determine, by a similarity engine of the query platform, a similar document vector embedding based on the document vector embedding;

send, by the query platform, an input comprising the query text string, the textual document data, the document embedding vector, and the similar document vector embedding to a generative model engine;

expose, by the generative model engine, an instructional parameter that instructs the generative model engine to generate a response using only documents associated with the group of tokens;

receive, by the query platform and from the generative model engine, a natural language response to the input; and display, by the query platform, the natural language response via an interface.

8. The system of claim 7, wherein the query platform retrieves the textual document data using a document identifier that is related to the textual document data.

9. The system of claim 8, wherein the textual document data includes a token, and where in the token was generated from a document stored in a document pool.

10. The system of claim 7, wherein the document vector embedding is stored in a vector database.

11. The system of claim 7, wherein the generative model engine is provided by a third party.

12. The system of claim 7, wherein the generative model engine includes a generative pretrained transformer (GPT) model.

13. A non-transitory computer readable storage medium, including instructions stored thereon, which instructions, when read and executed by one or more computer processors, cause the one or more computer processors to perform steps comprising:

receiving, at a query platform, a query text string;

tokenizing, by the query platform, the query text string, wherein the tokenizing generates a query vector embedding;

determining, by the query platform, a document vector embedding by numerically representing a semantic meaning of text of a group of tokens from a document;

comparing the document vector embedding to the query vector embedding and determining the comparison is above a similarity threshold;

retrieving, by the query platform, textual document data of the document related to the document vector embedding by using a document identifier from a datastore, wherein the document identifier interrelates the document, a token of the group of tokens from the document, and the document vector embedding;

determining, by a similarity engine of the query platform, a similar document vector embedding based on the document vector embedding;

sending, by the query platform, an input comprising the query text string, the textual document data, the document embedding vector, and the similar document vector embedding to a generative model engine;

exposing, by the generative model engine, an instructional parameter that instructs the generative model engine to generate a response using only documents associated with the document and one or more documents associated with the group of tokens;

receiving, by the query platform and from the generative model engine, a natural language response to the input; and displaying, by the query platform, the natural language response via an interface.

14. The non-transitory computer readable storage medium of claim 13, wherein the query platform retrieves the textual document data using a document identifier that is related to the textual document data.

15. The non-transitory computer readable storage medium of claim 14, wherein the textual document data includes a token, and where in the token was generated from a document stored in a document pool.

16. The non-transitory computer readable storage medium of claim 13, wherein the document vector embedding is stored in a vector database.

17. The non-transitory computer readable storage medium of claim 13, wherein the generative model engine is provided by a third party, and wherein the generative model engine includes a generative pretrained transformer (GPT) model.

* * * * *